Sept. 22, 1931.  R. G. HORTON ET AL  1,824,349
POWER ATTACHMENT FOR SAW SWAGES
Filed Feb. 23, 1926  2 Sheets-Sheet 1
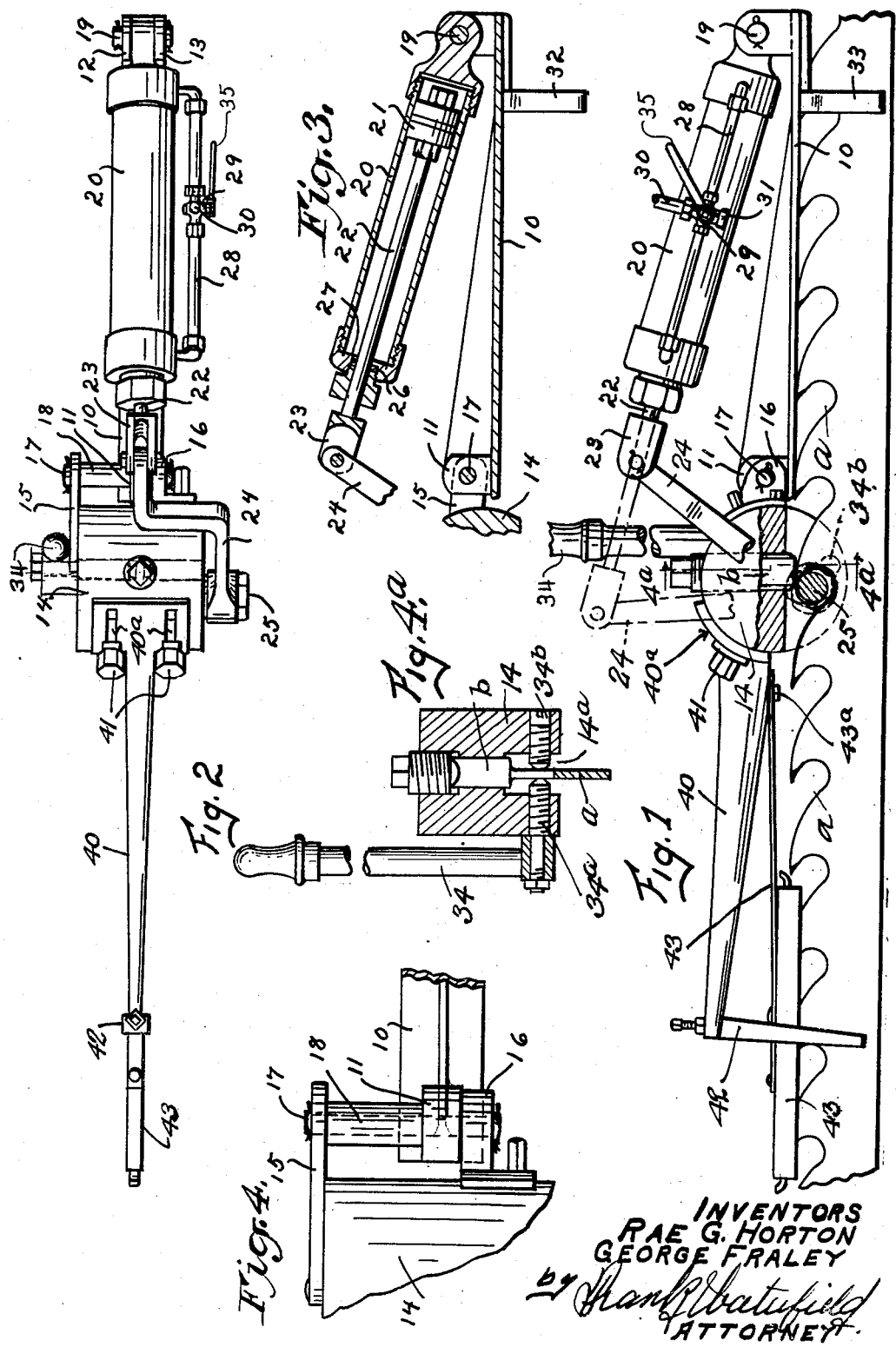
INVENTORS
RAE G. HORTON
GEORGE FRALEY
ATTORNEY Sept. 22, 1931.  R. G. HORTON ET AL  1,824,349
POWER ATTACHMENT FOR SAW SWAGES
Filed Feb. 23, 1926  2 Sheets-Sheet 2

INVENTORS
RAE G. HORTON
GEORGE FRALEY
by Frank Watifield
ATTORNEY

Patented Sept. 22, 1931

1,824,349

UNITED STATES PATENT OFFICE

RAE G. HORTON AND GEORGE FRALEY, OF FRESNO, CALIFORNIA

POWER ATTACHMENT FOR SAW SWAGES

Application filed February 23, 1926. Serial No. 89,826.

Our invention relates to saw swages and particularly to power attachments therefor.

Saw swages are commonly hand operated and while this practice is entirely satisfactory on saws of light gauges, the band saws now used in large mills are ⅛ of an inch or more thick, 16 inches wide and 65 feet or more long.

With saws of such sizes the swaging is a tedious and laborious piece of work, further introducing inaccuracies due to fatigue of the operator; and tending to turn out a saw not uniformly swaged.

Anti-friction bearings have been used in these manually operated swages and various other devices for reducing the energy required for operating them; but it still remained an unsatisfactory and difficult piece of work, subject to all the defects of manual operation.

The principal object of our invention is to provide a portable power attachment for saw swages capable of operating the saw swage uniformly and accurately so as to turn out a saw whose teeth are uniformly swaged to exactly the same degree.

A further object of our invention is to provide a portable power attachment preferably operated by fluid pressure adapted to be connected easily and quickly to any manually operated swage, by merely removing the operating lever and connecting my attachment in its place.

At present all saw mills are commonly equipped with an air compressing plant for supplying compressed air where needed about the mill, or with steam pressure either of which can supply the fluid pressure required for operating our power attachment. However, we preferably use compressed air, as there is no radiation of heat nor objectionable exhaust of steam.

A still further object of our invention is to provide a power attachment, simple and economical of construction and operation.

We attain our objects in the combination with a saw swage of the character described of portable means for applying mechanical power to the operating lever of the saw swage, such means comprising a supporting plate adapted to be mounted over the teeth of the saw to be swaged and firmly secured at one end to the swage, and a power element including a member projected and retracted, such element pivotally supported on said supporting plate, said member connected to the operating lever of the swage and means for controlling said power element.

Other objects and advantages will appear hereinafter, and, while we have shown and will describe the preferred form of our invention, we wish it understood that we do not limit ourselves to such preferred form, but that various changes and adaptations may be made therein without departure from the spirit of our invention.

In the drawings:

Fig. 1 is a side elevation of our device, positioned for use upon a band saw, in its inoperative position.

Fig. 2 is a top plan of Fig. 1.

Fig. 3 is a fragmentary central vertical section of Fig. 1.

Fig. 4 shows an enlarged fragmentary detail of our device and illustrates how the supporting plate is connected to the swage casing.

Fig. 4a shows a section taken on the line 4a—4a of Fig. 1 and illustrates the details of construction of the swage.

Figure 6:
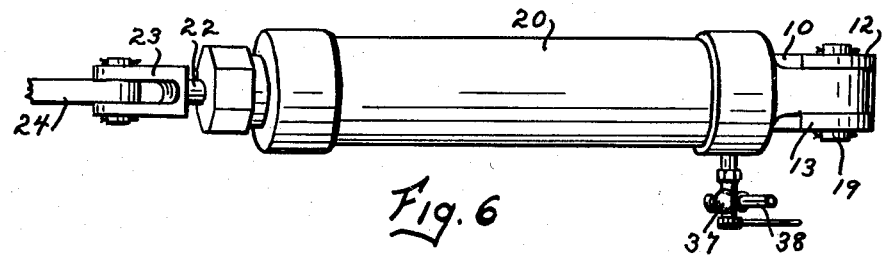
Fig. 6 is a top plan of Fig. 5.

We will describe our invention as adapted to be operated by compressed air, but as before mentioned, it may be operated by steam pressure with minor adjustments of the valves or by other means.

The usual saw swage of this type comprises a casing 14 having an opening 14a for receiving the saw blade a. Opposed clamping screws, 34a, 34b are threaded into each side the casing and arranged to bear on each side the saw blade, the screw 34a being operable by an operating handle 34.

The swage die 25 is arranged transversely in the casing 14 so as to lie in the throat of the tooth and bear against the under side of its point. A lever 24 is provided on one end of the die by which it is operated to swage the saw tooth against an anvil b carried by the casing and bearing on the top of the said tooth.

Our power attachment comprises a fluid pressure cylinder 20, pivoted at one end on a horizontal plate 10, between upstanding lugs 12 and 13 by means of a pin 19.

The plate 10 is provided with a central longitudinal web on its upper surface, which slopes gradually from the end on which the cylinder is pivoted and by which the plate is pivoted between lugs 15 and 16 fastened to the swage casing in any convenient manner by a pin 17 and spacers 18 mounted over the pin 17.

The under side of the plate 10 is provided with downwardly extending lugs or guides 32 and 33 which hold the plate alined with the saw, the plate being adapted to rest on the top of the teeth in the usual manner.

The cylinder 20 is provided with a piston 21 fixed to a piston rod 22, which extends out of the cylinder through packing glands 26 and 27.

An operating lever 24 is pivoted to the end of the rod 22 in a yoke 23, and the other end of the operating lever 24 is fixed on the swage die 25, the manual operating lever having been first removed.

An arm 40 is adjustably secured to the opposite side of the housing 14 from the plate 10, by means of bolts 41 in slots 40a and projects along the saw blade and above it, Fig. 1. A forked member 42 is carried by the said arm which is arranged over the saw blade and a spring element 43 is secured to the said arm as at 43a and carries on its other end a guide 44 resting on the teeth of the saw and between the forked member 42 by which the swage die 25 is held in position during the swaging operation.

A conduit 28 is connected to each end of the cylinder, Fig. 2, and in its center is provided a four way valve 29, operated by a lever 35. A fluid pressure supply pipe 30 is connected to one of the ports of the valve and the other port opens into the atmosphere. The valve is so arranged that when fluid pressure is turned into the conduit 28 in one direction, the other half of the conduit will be opened to the atmosphere.

To connect our power attachment to the swage, the manual operating lever will be removed and the operating lever 24 connected in its place. The plate 10 will be fastened to the swage casing 14, by the pin 17, the plate being supported on the top of the teeth of the saw.

The swage having been properly adjusted and clamped on the saw by the lever 34 and the operating lever being in the full line position shown in Fig. 1, and the piston 21 in the far end of the cylinder, the valve 29 will be turned so as to admit fluid pressure behind the piston, and force it vigorously forward, thus operating the swage die. Simultaneously, the portion of the conduit connected to the forward end of the piston will be opened to the atmosphere through the four way valve and the fluid held in front of the piston will exhaust.

At the end of the stroke, which is shown in the lines in Fig. 1, the valve 29 will be reversed by the operator so that pressure will be admitted in front of the piston and allowed to exhaust from behind it, thus the swage will be returned to its inoperative position and the swage may be moved to the next tooth to be operated on.

It may be readily seen that each operation of the swage die will be with exactly the same force and thus each tooth will be swaged to exactly the same degree and that the number of teeth swaged in the course of a day will be materially increased by the rapidity with which the swage may be operated at a great saving in operating cost and without fatigue to the workman.

Figure 7:
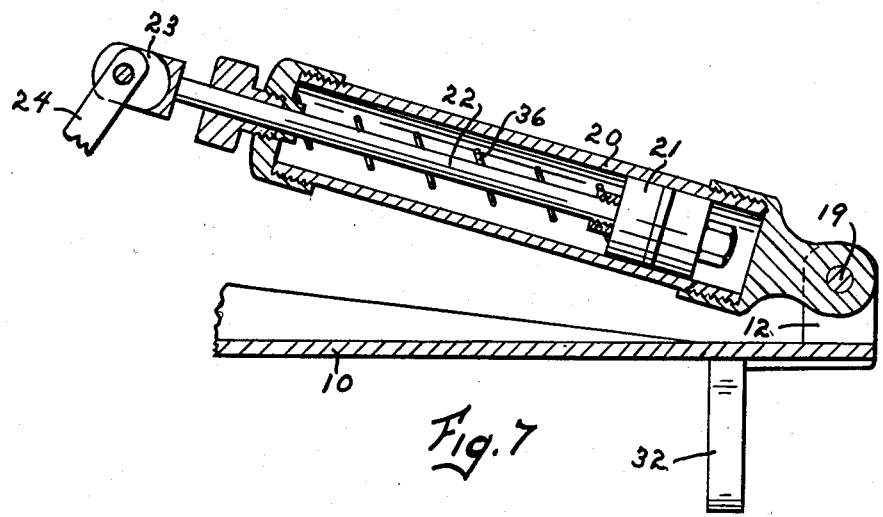
Fig. 7 is a central vertical section through Fig. 5.
Figure 5:
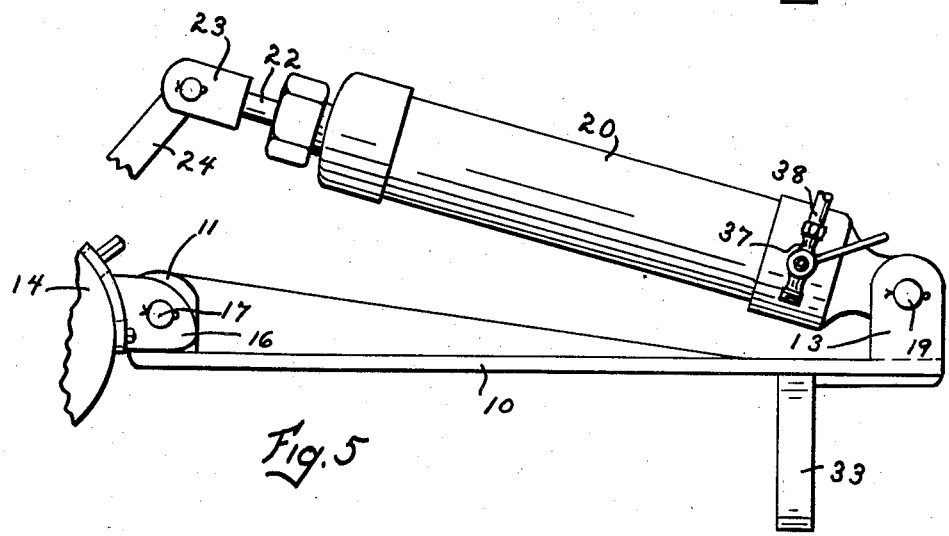
Fig. 5 is an enlarged side elevation of another form of our device.

In the form shown in Figs. 5 to 7 inclusive, our device is essentially the same as in the preferred form with the exception that fluid pressure is used to force the piston forward only, a spring 36 being used to return the piston to its starting point, and a two-way valve 37, one end of which is connected by a supply pipe 38 to a source of supply, not shown, and the other end of which is connected to atmosphere.

Fluid pressure operating means for the saw swage, are preferable because considered most convenient, however we do not limit our invention to such power means.

Having described our invention what we claim is:

1. A saw swage comprising a supporting plate of substantial length provided at one of its ends with means for firmly mounting the plate over the teeth of a saw, a swage carried by the other end of said plate in position for operating upon the teeth of the saw, said swage provided with an operating arm, fluid pressure operated means pivotally secured to one end of the plate and connected with said arm, the housing of the swage provided on one side with means by which it is pivotally connected to said plate and an arm adjustably secured to the opposite side of the housing such arm extending parallel with the saw and at a variable angle with the plane touched by the saw teeth.

2. A saw swage comprising a supporting plate of substantial length provided at one of its ends with means for firmly mounting the plate over the teeth of a saw, a swage carried by the other end of said plate in position for operating upon the teeth of the saw, said swage provided with an operating arm, fluid pressure operated means pivotally secured to one end of the plate and connected with said arm, the housing of the swage provided on one side with means by which it is pivotally connected to said plate and an arm adjustably secured to the opposite side of the housing such arm extending parallel with the saw and at a variable angle with the plane touched by the saw teeth, the extremity of such arm provided with means for firmly engaging the saw blade, whereby the operative relation of the die of the swage may be adjusted relatively to the teeth.

3. A saw swage comprising a supporting plate of substantial length provided at one of its ends with means for firmly mounting the plate over the teeth of a saw, a swage carried by the other end of said plate in position for operating upon the teeth of the saw, said swage provided with an operating arm, fluid pressure operated means pivotally secured to one end of the plate and connected with said arm and an arm adjustably secured to the opposite side of the housing such arm extending parallel with the saw and at a variable angle with the plane touched by the saw teeth.

4. A saw swage comprising a supporting plate of substantial length provided at one of its ends with means for firmly mounting the plate over the teeth of a saw, a swage carried by the other end of said plate in position for operating upon the teeth of the saw, said swage provided with an operating arm, fluid pressure operated means pivotally secured to one end of the plate and connected with said arm, and an arm adjustably secured to the opposite side of the housing such arm extending parallel with the saw and at a variable angle with the plane touched by the saw teeth, the extremity of such arm provided with means for firmly engaging the saw blade, whereby the operative relation of the die of the swage may be adjusted relatively to the teeth.

5. A power operated saw swage comprising a swage-head provided with an anvil, a die, a die operating lever, and means for clamping the swage-head firmly on the saw blade to be operated upon, a supporting arm provided on said swage-head and radially adjustable thereon to permit the angular adjustment of the swage-head relatively to the desired position of the anvil thereof, the free end of said arm provided with means for supporting the same on the saw blade and power actuated operating means mounted on said supporting arm and connected with said operating lever.

6. A power operated saw swage comprising, a swage-head provided with an anvil, a die, a die operating lever, and means for clamping the swage-head firmly on the saw blade to be operated upon, a supporting arm provided on said swage head and radially adjustable thereon to permit the angular adjustment of the swage-head relatively to the desired position of the anvil thereof, the free end of said arm provided with means for supporting the same on the saw blade and fluid pressure operating means mounted on said supporting arm and connected with said operating lever.

In witness that we claim the foregoing we have hereunto subscribed our names this 31st day of December, 1925.

RAE G. HORTON.
GEORGE FRALEY.